Patented Feb. 9, 1954

2,668,817

UNITED STATES PATENT OFFICE 2,668,817

3,11 ALPHA, 20-TRIACYLOXY-3,17(20)-PREGNADIENES AND PROCESS

Barney J. Magerlein, Kalamazoo, Mich., assignor to The Upjohn Company, Kalamazoo, Mich., a corporation of Michigan No Drawing. Application March 1, 1952,
Serial No. 274,500

14 Claims. (Cl. 260—397.5)

1

The present invention relates to certain steroid compounds, and is more particularly concerned with 3,11α,20-triacyloxy-3,17(20)-pregnadienes and to a process for the production thereof.

The novel compounds of the present invention may be represented by the formula:

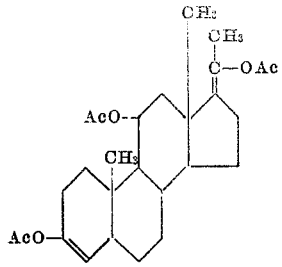

wherein AcO is an acyloxy group, Ac being the acyl residue of an organic carboxylic acid, especially such acids containing from one to eight carbon atoms, inclusive. These compounds may be prepared from 11α-hydroxypregnane-3,20-dione as described in my co-pending application, Serial Number 261,159, filed December 11, 1951, of which this application is a continuation-in-part.

It is an object of the present invention to provide a group of novel compounds, 3,11α,20-triacyloxy-3,17(20)-pregnadienes, which have utility in the preparation of biologically-active compounds, such as cortisone and its derivatives, and which are also physiologically active, per se. A further object of the invention is the provision of a process for the production of 3,11α,20-triacyloxy-3,17(20)-pregnadienes. Other objects of the invention will be apparent to those skilled in the art to which this invention pertains.

The 3,11α,20-triacyloxy-3,17(20)-pregnadienes are useful in the preparation of other steroid compounds having an oxygen atom at carbon atom eleven, such as cortisone acetate, which may be obtained, for example, by oxidation of the three and 17(20)-double bonds with hydrogen peroxide or a peracid to give 3(4) and 17(20)-epoxide groups, hydrolysis of the three, eleven, and twenty-acyloxy groups and the 3(4) and 17(20)-epoxide groups, using acid or base, to give four, eleven, and seventeen-hydroxy groups and three and twenty-ketone groups, bromination with bromine in chloroform to introduce a bromine atom at the 21 position, replacement of the 21-bromine by a 21-acetoxy group using potassium acetate in acetic acid, dehydration with oxalic acid in carbon tetrachloride to remove the four-hydroxy group and introduce a double bond at the four position, and oxidation of the eleven-

2 hydroxyl group to an eleven-ketone group using chromic oxide. Such compounds are of particular interest in the field of steroid research due to the biological activity of the cortical hormones and certain known derivatives thereof. The importance of such investigation is moreover emphasized by the shortage of adrenal cortical hormones, and the absence of any present suggestion for the alleviation of said shortage except through organic synthesis.

The 3,11α,20-triacyloxy-3,17(20)-pregnadienes which are of particular interest are those compounds of the above generic formula wherein AcO represents an ester of the eleven-hydroxyl group and an enol ester of the three and twenty-hydroxyl groups, with an organic carboxylic acid. Among such acids are formic, acetic, propionic, butyric, valeric, hexanoic, heptanoic, octanoic, cyclopentanecarboxylic, cyclopentylpropionic, benzoic, toluic, oxalic, and the like. Preferred are those ester groups derived from the lower-aliphatic acids, especially those containing from one to eight carbon atoms, inclusive. The acids may also contain substituents, such as halo, alkyl, and methoxy, which are non-reactive under the reaction conditions employed. The three, eleven, and twenty-ester groups may be the same, or the three and twenty-ester groups the same and the eleven-ester group different, depending on the starting compounds. When the starting compound contains an eleven-hydroxyl group, or an eleven-ester group which is the same as the ester groups being introduced into the starting compound by the process of this invention, the three, eleven, and twenty-ester groups will be the same in the resulting 3,11α,20-triacyloxy-3,17(20)-pregnadienes. When the starting compound contains an eleven-ester group which is different from the ester groups being introduced into the starting compound by the process of this invention, the three and twenty-ester groups will be the same, but the eleven-ester group will be different, in the resulting 3,11α,20-triacyloxy-3,17(20)-pregnadienes.

According to the novel process of this invention, 3,11α,20-triacyloxy-3,17(20)-pregnadienes of the above generic formula are prepared from 11α-hydroxypregnane-3,20-dione and 11α-acyloxypregnane-3,20-diones by enol acylation of the three and twenty-ketone groups, an eleven-hydroxyl group, if present, also being acylated, by heating with an acylating agent, in the presence of an acid catalyst, with or without the addition of a solvent.

In carrying out the process of this invention, a starting 11α-hydroxypregnane-3,20-dione or a starting 11α-acyloxypregnane-3,20-dione is admixed with an acylating agent. Suitable acylating agents are acid halides such as the acid chlorides, acid anhydrides, and others, with the acid anhydrides being preferred, the acylating agent containing the acyl residue of an organic carboxylic acid, especially those containing from one to eight carbon atoms, inclusive. Among such acids are formic, acetic, propionic, butyric, valeric, hexanoic, heptanoic, octanoic, cyclopentanecarboxylic, cyclopentylpropionic, benzoic, toluic, oxalic, and the like. The acids may also contain substituents, such as halogen, alkyl, methoxy, and others, which are non-reactive under the reaction conditions employed. Usually a large excess of the acylating agent is used. However any quantity from about the theoretical amount to about 500 times this amount, or even more, is operative, with an excess of about fifty to about 150 times the theoretical amount being preferred. A small amount of an acid catalyst such as sulfuric acid, a sulfonic acid, and the like, with para-toluene-sulfonic acid being preferred, is added, and the resulting mixture is heated, usually at about 100 to 200 degrees centigrade, lower or higher temperatures also usually being operative, preferably at the boiling point of the mixture. Usually the reaction mixture is slowly distilled until most of the excess acylating agent is removed, a reaction period of about one to twenty hours being satisfactory, with a period of about two to five hours being preferred. Sometimes it is preferred to heat the reaction mixture without distillation. Sometimes it is preferred to add a suitable solvent to control the maximum temperature while heating the reaction mixture, especially if the acylating agent has a high boiling point. Suitable solvents are benzene, toluene, xylene, paraffin hydrocarbons, cycloparaffin hydrocarbons, and the like. The 3,11α,20-triacyloxy-3,17(20)-pregnadienes can then be isolated in any convenient manner, for example, if most of the excess acylating agent has been removed during the reaction, the last traces may be removed under vacuum, the residue dissolved in an organic solvent such as ether, benzene, chloroform, and the like, the resulting solution washed with an aqueous basic solution such as aqueous sodium bicarbonate, sodium carbonate, sodium hydroxide, and the like, the washed solution dried by a drying agent such as sodium sulfate, the dried solution filtered to remove the drying agent, the solvent distilled, and the residue crystallized from a suitable solvent such as ethanol. Alternatively, if the excess acylating agent has not been removed, the reaction mixture may be stirred with water or a basic solution such as aqueous sodium bicarbonate solution to decompose the excess acylating agent, then, as described for the first method, the resulting mixture extracted with an organic solvent, the organic solution washed with a basic solution, and the product isolated from the washed organic solution. Sometimes it is preferred not to crystallize the residue obtained from the organic solution, since the product in this form is usually of sufficient purity to be used in subsequent reactions. The crystalline product may be further purified by recrystallization from suitable solvents which are non-reactive with the desired 3,11α,20-triacyloxy-3,17(20)-pregnadienes, such as ethanol, ethanol-water mixtures, isopropanol, and the like.

The starting 11α-hydroxypregnane-3,20-dione is obtained from 11α-hydroxyprogesterone by catalytic reduction in ethanol using a palladium-charcoal catalyst as more fully described in Preparation 2. 11α-hydroxyprogesterone is prepared from progesterone by a fermentation process more fully described in Preparation 1. The starting 11α - acyloxypregnane-3,20-diones are prepared by acylation of 11α-hydroxypregnane-3,20 dione, obtained as described above, by using an excess of an acid anhydride with a solvent such as pyridine. Formic acid is used as the acylating agent to prepare the eleven-formyloxy compound. The reaction mixture is allowed to stand at room temperature from twelve to twenty hours, and the product isolated by conventional procedure.

The following examples are illustrative of the process and products of the present invention, but are not to be construed as limiting:

*Preparation 1.—11α-hydroprogesterone*

A medium was prepared from five milliliters of corn steep liquor, twenty grams of Edamine commercial lactalbumin digest, and fifty milligrams of Cerelose commercial dextrose, per liter of tap water and adjusted to a pH of between about 5.5 and about 5.9. To four liters of this medium containing a 32 to 48 hour growth, at room temperature with aeration, of *Rhizopus arrhizus*, was added one gram of progesterone in fifty milliliters of acetone, providing a suspension of the steroid in the water of the culture. The culture was then incubated at room temperature for 48 hours. At the end of this time the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of two percent aqueous sodium bicarbonate solution and three 500-milliliter portions of water. The methylene chloride extract was evaporated to dryness in vacuo and the solids taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly at room temperature, whereupon 75 milligrams of crystals separated out. The mother liquor was freed of solvent by aeration, dissolved in fifty milliliters of benzene, and chromatographed over alumina ($Al_2O_3$). Fifty grams of acid-washed alumina, dried at 45 degrees centigrade, was used as adsorbent and 100-milliliter portions of solvents were used to develop the column. The solvents and the order used were as follows: benzene, benzene, benzene plus 5% ether, benzene plus 5% ether, benzene plus 10% ether, benzene plus 10% ether, benzene plus 10% ether, benzene plus 50% ether, benzene plus 50% ether, ether, ether, ether plus 5% chloroform, ether plus 5% chloroform, ether plus 10% chloroform, ether plus 10% chloroform, ether plus 50% chloroform, ether plus 50% chloroform, chloroform, chloroform, chloroform plus 5% acetone, chloroform plus 5% acetone, chloroform plus 10% acetone, chloroform plus 10% acetone, chloroform plus 50% acetone, chloroform plus 50% acetone, acetone, acetone, acetone plus 5% methanol, acetone plus 5% methanol, acetone plus 10% methanol, acetone plus 10% methanol, acetone plus 50% methanol, acetone plus 50% methanol, The chloroform and chloroform plus 5% acetone eluates were combined, evaporated to dryness, and the residue dissolved in two milliliters of hot methanol and filtered. After overnight refrigeration, 171 milligrams of crystalline 11α-hydroxyprogesterone, melting at 166 to 167 degrees centigrade, was obtained. A recrystallized sample gave the following constants: melting point, 166–167 degrees centigrade; $[\alpha]_D^{20}$ plus 175.9 degrees (chloroform).

Analysis.—Percent calculated for $C_{21}H_{30}O_3$: C, 76.4; H, 9.10. Found: C, 76.6; H, 8.92.

The structure of this product was further established by its conversion, with chromic acid in acetic acid, to 11-keto-progesterone [Reichstein, Helv. Chim. Acta, 23, 684 (1940); ibid 26, 721 (1943)].

Preparation 2.—11α-hydroxypregnane-3,20-dione

A solution of 250 miligrams of 11α-hydroxyprogesterone from Preparation 1 in 100 milliliters of ethanol containing six drops of triethylamine was subjected to hydrogenation at room temperature under a pressure of about ten pounds of hydrogen in the presence of 45 milligrams of a thirty per cent palladium-charcoal catalyst in a Parr apparatus with an auxiliary mercury manometer. The time required for the hydrogenation was about twenty minutes. The reaction mixture was filtered and the solvent was evaporated to yield 265 milligrams of material melting at 145–185 degrees centigrade. This product was extracted with a mixture of one milliliter of ether and nine milliliters of Skelly Solve B. On standing, the extract deposited eighty milligrams (32 per cent) of 11α-hydroxypregnane-3,20-dione as feathery needles which melted at 85–90 degrees centigrade. Recrystallization from a mixture of about six drops of ethyl acetate and five milliliters of Skelly Solve B did not change the melting point.

Analysis.—Per cent calculated for $C_{21}H_{32}O_3$: C, 75.86; H, 9.70. Found: C, 76.13; H, 9.63.

Preparation 3.—11α-acetoxypregnane-3,20-dione

A mixture of 70.5 milligrams of 11α-hydroxypregnane-3,20-dione from Preparation 2, 0.8 milliliter of acetic anhydride, and 0.7 milliliter of pyridine was allowed to stand for sixteen hours at room temperature and then poured into ice water. The precipitated product was isolated by filtration and dried. The yield of 11α-acetoxypregnane-3,20-dione melting at 143.5–146.5 degrees centigrade was 67 milligrams (84 per cent). After one recrystallization from ether-Skelly Solve B, the melting point was 150–151 degrees centigrade; $[\alpha]_D^{23}$=plus 63 degrees (c=0.803 in chloroform).

Analysis.—Per cent calculated for $C_{23}H_{34}O_4$: C, 73.76; H, 9.15. Found: C, 73.93; H, 9.32.

Preparation 4.—11α-propionoxypregnane-3,20-dione

Using the procedure described in Preparation 3, 11α-hydroxypregnane-3,20-dione from Preparation 2 is converted to 11α-propionoxypregnane-3,20-dione using propionic anhydride in pyridine.

Preparation 5.—11α-heptanoyloxypregnane-3,20-dione

Using the procedure described in Preparation 3, 11α-hydroxypregnane-3,20-dione from Preparation 2 is converted to 11α-heptanoyloxypregnane-3,20-dione using heptanoic anhydride and pyridine.

In the same manner as given above in Preparation 3 through Preparation 5, other 11α-acyloxypregnane-3,20-diones are prepared from the 11α-hydroxypregnane-3,20-dione of Preparation 2, including, 11α-formyloxypregnane-3,20-dione; 11α-butyryloxypregnane-3,20-dione; 11α-valeryloxypregnane-3,20-dione; 11α - hexanoyloxypregnane-3,20-dione; 11α-octanoyloxypregnane-3,20-dione; and the like.

Example 1.—3,11α,20 -triacetoxy-3,17(20)-pregnadiene

Three hundred milligrams of 11α-hydroxypregnane-3,20-dione from Preparation 2, fifteen milliliters of acetic anhydride, and 140 milligrams of para-toluenesulfonic acid monohydrate were mixed, and the resulting mixture heated to boiling and allowed to distil slowly for four hours, most of the excess acetic anhydride being distilled at the end of this time interval. The last traces of excess acetic anhydride were removed under vacuum, and the resulting residue was cooled and dissolved in ether. The ether solution was washed with cold ten per cent aqueous sodium bicarbonate solution and dried over anhydrous sodium sulfate. The drying agent was removed by filtration, and the ether was distilled. The residue was dissolved in warm alcohol and allowed to crystallize. The crystalline 3,11α,20-triacetoxy-3,17(20)-pregnadiene, 150 milligrams, melted at 162–167 degrees centigrade. Its structure was confirmed by infra-red analysis.

Example 2.—3,11α,20-triacetoxy-3,17(20)-pregnadiene

Three hundred sixty milligrams of 11α-acetoxypregnane-3,20-dione from Preparation 3, twenty milliliters of acetic anhydride, and fifty milligrams of para-toluenesulfonic acid monohydrate were heated with slow distillation of the reaction mixture for three hours, most of the excess acetic anhydride being distilled at the end of this period. The last traces of excess acetic anhydride were removed under vacuum, and the residue was cooled and dissolved in ether. The resulting ether solution was washed with ten per cent aqueous sodium bicarbonate solution and with water and then dried over anhydrous sodium sulfate. The drying agent was removed by filtration, and the ether was distilled. The residue was dissolved in warm alcohol and allowed to crystallize. The crystalline 3,11α,20-triacetoxy-3,17(20)-pregnadiene, melting point 168–175 degrees centigrade, weighed 195 milligrams. Recrystallization from aqueous alcohol gave 160 milligrams, melting point 171–176 degrees centigrade. The product was identical with the 3,11α,20 - triacetoxy - 3,17(20) - pregnadiene obtained in Example 1.

Example 3.—11α-acetoxy-3,20-dipropionoxy-3,17(20)-pregnadiene

Fifty milligrams of 11α-acetoxypregnane-3,20-dione from Preparation 3 is converted to 22 milligrams of 11α - acetoxy - 3,20 - dipropionoxy-3,17(20)-pregnadiene by the procedure of Example 2, using propionic anhydride and para-toluenesulfonic acid.

Example 4.—3,11α,20-tripropionoxy-3,17(20)-pregnadiene

Using the procedure of Example 1, 11α-hydroxypregnane-3,20-dione from Preparation 2 is converted to 3,11a,20-tripropionoxy-3,17(20)-pregnadiene using propionic anhydride and para-toluenesulfonic acid.

*Example 5.—3,11a,20-tripropionoxy-3,17(20)-pregnadiene*

Using the procedure of Example 2, 11a-propionoxypregnane-3,20-dione from Preparation 4 is converted to 3,11a,20-tripropionoxy-3,17(20)-pregnadiene using propionic anhydride and para-toluenesulfonic acid. The product was identical with the 3,11a,20-tripropionoxy-3,17(20)-pregnadiene obtained in Example 4.

*Example 6.—3,11a,20-triheptanoloxy-3,17(20)-pregnadiene*

11a-hydroxypregnane-3,20-dione from Preparation 2 is converted by the procedure of Example 1 to 3,11a,20-triheptanoyloxy-3,17(20)-pregnadiene by heating for five hours with heptanoic anhydride and para-toluenesulfonic acid with toluene added as a solvent.

*Example 7.—3,20-diacetoxy-11a-heptanoyloxy-3,17(20)-pregnadiene*

Using the procedure of Example 2, 11a-heptanoyloxypregnane-3,20-dione is converted to 3,20-diacetoxy-11a-heptanoyloxy-3,17(20)-pregnadiene using acetic anhydride and para-toluenesulfonic acid.

In the same manner as given above, other 3,11a,20-triacyloxy-3,17(20)-pregnadienes are prepared, including: 3,20-diacetoxy-11a-formyloxy-3,17(20)-pregnadiene; 3,20-dibutyryloxy-11a-formyloxy-3,17(20)-pregnadiene; 3,20-dioctanoyloxy-11a-acetoxy-3,17(20)-pregnadiene; 3,20-diacetoxy-11a-propionoxy-3,17(20)-pregnadiene; 3,20-dibutyryloxy-11a-octanoyloxy-3,17(20)-pregnadiene; 3,11a,20-tributyryloxy-3,17(20)-pregnadiene; 3,11a,20-trivaleryloxy-3,17(20)-pregnadiene; 3,11a,20-trihexanoyloxy-3,17(20)-pregnadiene; 3,11a,20-trioctanoyloxy-3,17(20)-pregnadiene; and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A 3,11a,20-triacyloxy-3,17(20)-pregnadiene wherein AcO is an acyloxy group, Ac being the acyl residue of an unsubstituted alkanoic acid containing from one to eight carbon atoms, inclusive.

2. A 3,11a,20-triacyloxy-3,17(20)-pregnadiene wherein AcO is an acyloxy group, Ac being the acyl residue of an unsubstituted lower alkanoic acid.

3. A compound of claim 1 wherein the acyloxy groups are the same.

4. A compound of claim 1 wherein the acyloxy groups are different.

5. 3,11a,20-triacetoxy-3,17(20)-pregnadiene.

6. 11a-acetoxy-3,20-dipropionoxy-3,17(20)-pregnadiene.

7. 3,11a,20-tripropionoxy-3,17(20)-pregnadiene.

8. 3,11a,20-triheptanoyloxy-3,17(20)-pregnadiene.

9. 3,20-diacetoxy-11a-heptanoyloxy-3,17(20)-pregnadiene.

10. A process for the production of a 3,11a,20-triacyloxy-3,17(20)-pregnadiene, which includes: heating together (1) a compound selected from the group consisting of 11a-hydroxypregnane-3,20-dione and a 11a-acyloxypregnane-3,20-dione wherein AcO is an acyloxy group, Ac being the acyl residue of an organic carboxylic acid containing from one to eight carbon atoms, inclusive, with (2) an acylating agent containing an acyl group having from one to eight carbon atoms, inclusive, in the presence of (3) an acid catalyst, to produce a 3,11a,20-triacyloxy-3,17(20)-pregnadiene.

11. A process for the production of a 3,11a,20-triacyloxy-3,17(20)-pregnadiene, which includes: (a) mixing together (1) 11a-hydroxypregnane-3,20-dione with an excess of (2) an acid anhydride containing an acyl group having from one to eight carbon atoms, inclusive, in the presence of (3) an arylsulfonic acid catalyst, and (b) heating to produce a 3,11a,20-triacyloxy-3,17(20)-pregnadiene.

12. A process for the production of a 3,11a,20-triacyloxy-3,17(20)-pregnadiene, which includes: (a) mixing together (1) an 11a-acyloxypregnane-3,20-dione wherein AcO is an acyloxy group, Ac being the acyl residue of an organic carboxylic acid containing from one to eight carbon atoms, inclusive, with an excess of (2) an acid anhydride containing an acyl group having from one to eight carbon atoms, inclusive, in the presence of (3) an arylsulfonic acid catalyst, and (b) heating to produce a 3,11a,20-triacyloxy-3,17(20)-pregnadiene.

13. A process for the production of 3,11a,20-triacetoxy-3,17(20)-pregnadiene, which includes: (a) mixing together (1) 11a-hydroxypregnane-3,20-dione; (2) an excess of acetic anhydride; and (3) para-toluenesulfonic acid; and (b) heating at about the boiling point of the mixture, to produce 3,11a,20-triacetoxy-3,17(20)-pregnadiene.

14. A process for the production of 3,11a,20-triacetoxy-3,17(20)-pregnadiene, which includes: (a) mixing together (1) 11a-acetoxypregnane-3,20-dione; (2) an excess of acetic anhydride; and (3) para-toluenesulfonic acid, and (b) heating at about the boiling point of the mixture, to produce 3,11a,20-triacetoxy-3,17(20)-pregnadiene.

BARNEY J. MAGERLEIN.

No references cited.